US 6,594,928 B1

(54) APPARATUS TO IDENTIFY INFORMATION ON CONTAINERS

(76) Inventors: Burrell E. Clawson, 883 W. 16th St., Newport Beach, CA (US) 92663; Joan U. Clawson, 883 W. 16th St., Newport Beach, CA (US) 92663

( * ) Notice: Subject to any disclaimer, the term of this patent is extended or adjusted under 35 U.S.C. 154(b) by 0 days.

(21) Appl. No.: 09/334,694

(22) Filed: Jun. 16, 1999

(51) Int. Cl.[7] ................................................. G09F 3/00
(52) U.S. Cl. .......................... 40/310; 215/365; 359/440; 359/809
(58) Field of Search .................. 40/310, 665; 215/365; 283/81; 359/440, 809

(56) References Cited

U.S. PATENT DOCUMENTS

| | | | |
|---|---|---|---|
| 110,760 A | 1/1871 | Harrison | |
| 763,128 A | 6/1904 | Trumpour | |
| 1,032,610 A | 7/1912 | Kern | |
| 1,238,551 A | 8/1917 | Merklee et al. | |
| 1,761,995 A | 6/1930 | Siebe | |
| 2,203,155 A * | 6/1940 | Jullien et al. | 40/665 |
| 2,961,108 A * | 11/1960 | Johnson | 215/228 |
| 3,212,794 A * | 10/1965 | Crossan et al. | 281/44 |
| 3,599,362 A | 8/1971 | Klober | |
| 4,157,144 A * | 6/1979 | Weiler et al. | 215/252 |
| 4,278,167 A | 7/1981 | van Rossem | |
| 4,773,767 A * | 9/1988 | Coll | 374/147 |
| 4,860,684 A | 8/1989 | Al-Harbi | |
| 4,895,257 A | 1/1990 | Winslow | |
| 4,951,596 A | 8/1990 | Wallace, Jr. | |
| 4,979,325 A | 12/1990 | White | |
| 5,193,032 A * | 3/1993 | Hirth | 359/804 |
| 5,204,775 A * | 4/1993 | McDevitt | 359/442 |
| 5,207,746 A * | 5/1993 | Jones | 283/81 |
| 5,275,019 A * | 1/1994 | Pagani | 63/15 |
| 5,349,393 A * | 9/1994 | Kreft | 351/57 |
| 5,390,964 A | 2/1995 | Gray, Jr. | |
| 5,448,844 A | 9/1995 | Miller, Jr. et al. | |
| 5,478,824 A * | 12/1995 | Burns et al. | 351/172 |
| 5,760,975 A * | 6/1998 | DiGiovanni | 359/802 |
| 5,857,275 A * | 1/1999 | Deal | 40/310 |
| 6,036,017 A * | 3/2000 | Bayliss, IV | 206/534 |
| 6,081,392 A * | 6/2000 | Pensmith | 359/802 |
| 6,151,172 A * | 11/2000 | Ferraro | 359/802 |
| 6,170,952 B1 * | 1/2001 | La Haye et al. | 351/168 |
| 6,240,668 B1 * | 6/2001 | Clawson et al. | 40/665 |

* cited by examiner

Primary Examiner—J. J. Swann
Assistant Examiner—Andrea Chop
(74) Attorney, Agent, or Firm—Stout, Uxa, Buyan & Mullins, LLP; Frank J. Uxa

(57) ABSTRACT

An apparatus to facilitate identifying information located on a container, for example, a pharmaceutical container, includes at least one member adapted to be secured, for example, removably secured, to a container, and includes a magnifying lens.

14 Claims, 3 Drawing Sheets

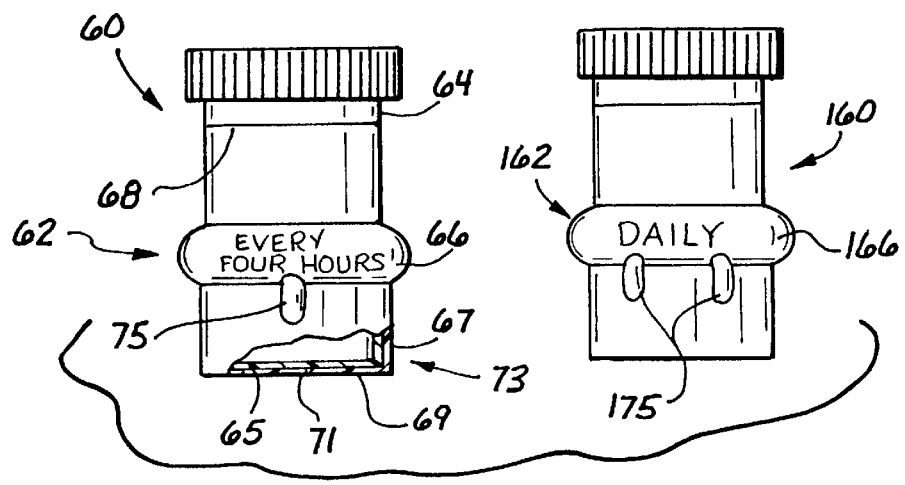
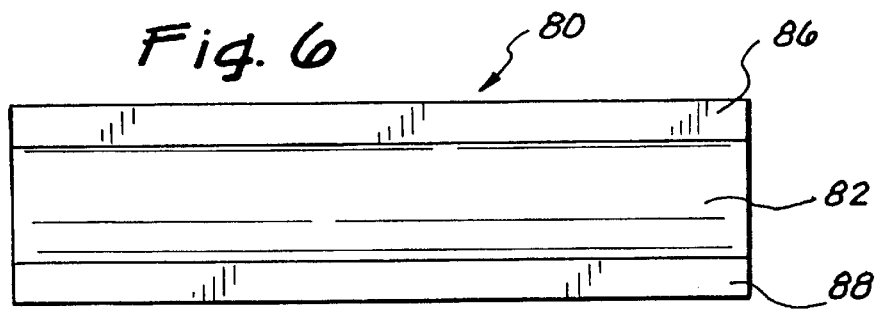
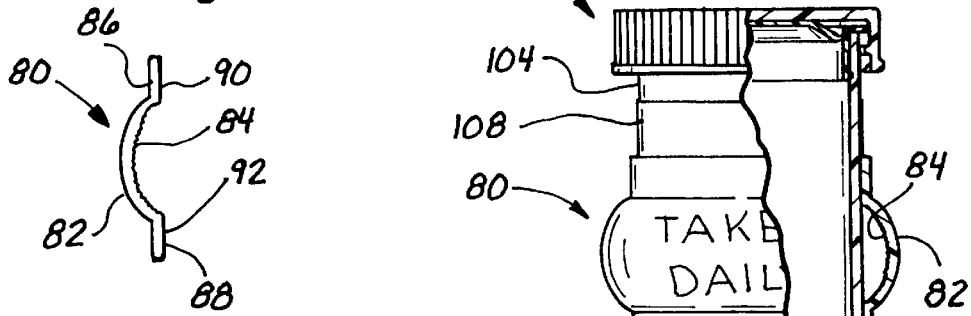

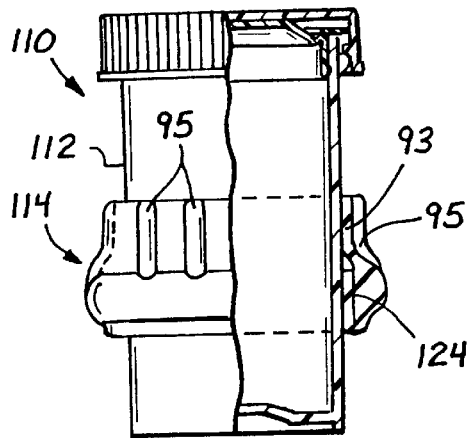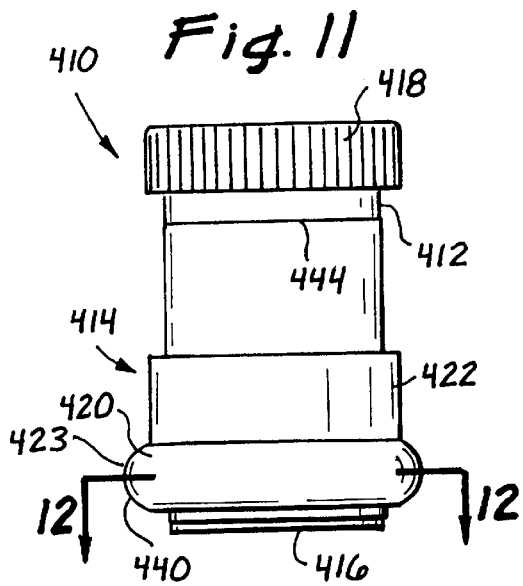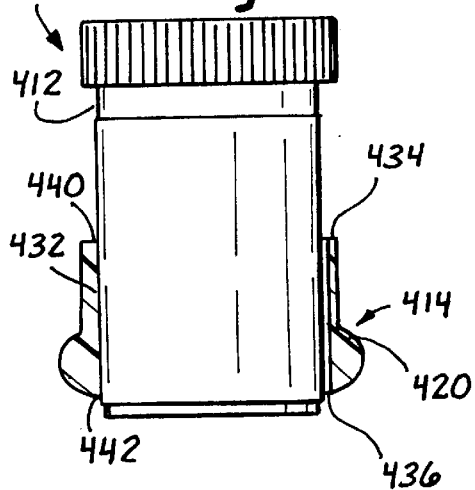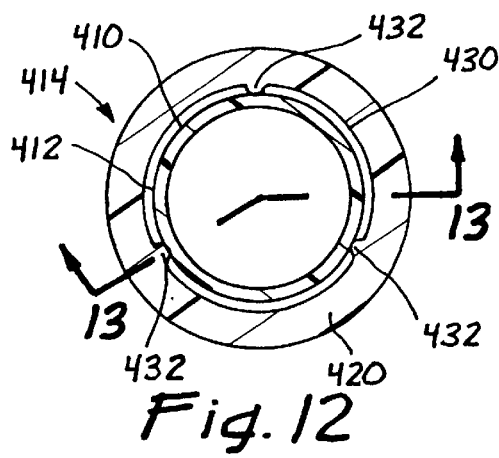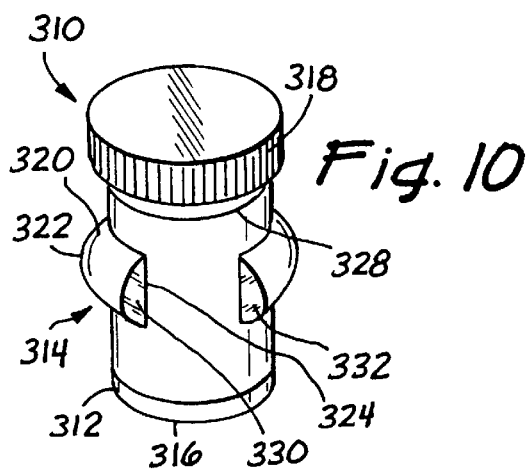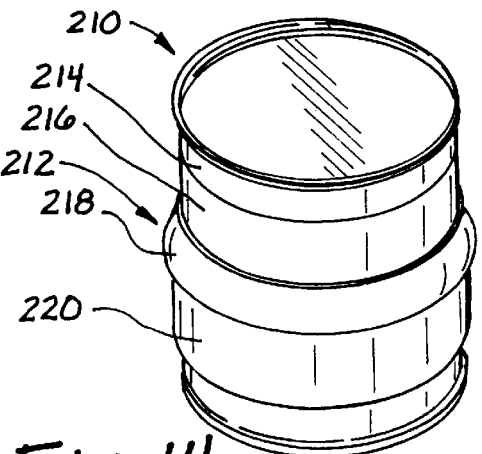

APPARATUS TO IDENTIFY INFORMATION ON CONTAINERS

BACKGROUND OF THE INVENTION

The present invention relates to apparatus to facilitate identifying information located on containers. More particularly, the invention relates to apparatus adapted to be secured to containers, for example, pharmaceutical or chemical containers, to identify information, for example, information relating to the contents of the containers, located on the containers.

Pharmaceuticals are an important and beneficial development of modern life. Humans often take or ingest more than one pharmaceutical to treat different conditions. It is important that the correct pharmaceutical be selected, from the plurality of pharmaceuticals in the user's possession, to treat a specific condition. In addition, the correct or proper dosage of the pharmaceutical should be taken for most effective results. Taking a wrong or incompatible medication, or an incorrect or improper dose of the medication can result in substantial detriment to, or even the death of, the user. For example, the study, "Drug-Related Morbidity and Mortality: A Cost of Illness Model", by J. Lylee Bootman, Dean of University of Arizona College of Pharmacy & Jeffrey Johnson, published on Oct. 9, 1995, in volume 155 of Archives of Internal Medicine, showed that the U.S. cost of dealing with problems due to prescription drug misuses from numerous causes is estimated at $75 billion and causes an estimated 198,000 premature deaths per year making it the largest cause of preventable death in the U.S. today.

Containers, for example, such as pharmaceutical containers, food containers, chemical containers and the like, have labels, fixedly taped and/or glued on outer peripheral, often cylindrical, sidewalls, which include substantial amounts of information on the product included in the container and its proper or recommended conditions or use. Such information, by necessity, is commonly set forth in relatively small print, for example, using substantially the same font everywhere, making it relatively difficult to read the information. Difficulty in reading is particularly true when the user of the material included in the container is temporarily or permanently visually impaired.

It would be advantageous to provide a system for easily and rapidly identifying information located on containers, even when the information is provided in a relatively small and/or difficult to read format.

SUMMARY OF THE INVENTION

Apparatus to facilitate identifying information located on a container have been discovered. The present invention provides for very quick, reliable and effective identification of information located on a container, for example, a pharmaceutical or chemical container, even when such information is presented in a small and/or otherwise difficult to see format. The container is provided with a very straightforward, easy to use system to facilitate identifying information located on the container. Ultimately, the user of the container is provided with an increased degree of comfort, safety, and assurance that he or she is using the specific desired material, for example, the pharmaceutical included in the container and using it, in the recommended or proper way.

In one broad aspect, the present invention is directed to apparatus to facilitate identifying information located on containers. The apparatus comprise members adapted to be secured to the containers. These members include magnifying lenses. The members preferably are removably secured to the containers, more preferably, secured other than adhesively to the containers. The member, by including a magnifying lens or magnifying lenses, which provides an enlarged image of the information located on the container, very effectively allows the user of the container to see the information located on the container. Thus, for example, the user of a container, such as a pharmaceutical or chemical container, can secure the present member on the container after having purchased or otherwise have been provided with the material in the container. In so doing, the user can clearly see the information located on the container and, ultimately, more effectively, reliably and safely use the contents of the container. Alternately, the container can be sold or otherwise provided to the consumer with the present member, including the magnifying lens, secured to the container prior to or at the time the container is provided to the consumer.

In one particularly useful embodiment, the magnifying lens comprises an elastic or elastomeric material, more preferably such a material which is near transparent, transparent or even optically clear. At least a portion of the member and/or the magnifying lens preferably are made of a polymeric material, more preferably an elastomeric polymeric material, such as an elastomeric thermoplastic or thermosetting polymeric material, for example, rubber. Thermoplastic members are very useful in relatively mild environments and in single use applications. Thermosetting members are advantageous under more severe conditions, for example, elevated temperature conditions, and/or when the member is to be reused, for example, reused repeatedly.

In another useful embodiment, the member comprises a substantially rigid material, for example, a substantially rigid polymeric material. To illustrate, the magnifying lens or lenses or the entire member can be made of such substantially rigid material. Members comprising such substantially rigid materials are particularly useful in embodiments in which the magnifying lens or lenses are made of such materials—for example, to provide enhanced clarity in viewing the magnified information—and when the member is adapted to circumscribe only a portion of the outer peripheral surface of the container. In this latter circumstance, the rigidity of the material can be useful in securing, for example, frictionally securing, the member to the container. Also, members made of such substantially rigid material advantageously include a plurality of inwardly extending projections or nibs adapted, when the member is secured to the container, to contact the outer peripheral surface of the container so that at least one of the projections is located between the magnifying lens and the outer peripheral surface. Such projections may also allow the member made of substantially rigid material to be secured to containers of slightly different sizes.

A very useful embodiment of the invention provides that the member, including the magnifying lens, is an integral or unitary structure.

The member may include a securement portion, in addition to the magnifying lens, adapted to facilitate securing the member to the container. This securement portion may comprise an elastomeric material. The securement portion preferably is made of a polymeric material, more preferably an elastomeric polymeric material, such as an elastomeric thermoplastic rubber or thermosetting, e.g., silicone, polymeric material. More preferably, the securement portion is unitary with the magnifying lens.

The present members can be made using techniques which are conventional and well known, such as molding and/or other processes conventionally used to produce articles from polymeric materials.

In one embodiment, the container includes an outer peripheral surface and the member is adapted, when it is secured to the container, to circumscribe at least a portion, preferably a major portion—this is at least about 50%, of the outer peripheral surface of the container. The member may be in the form of a C-clamp and only partially circumscribe the outer peripheral surface of the container. Such partially circumscribing members advantageously comprise substantially rigid polymeric materials, such as certain acrylics, for example polymethyl methacrylate (PMMA) and the like; polycarbonates; other substantially rigid polymeric materials and the like. The member can circumscribe all of the outer peripheral surface of the container. The magnifying lens preferably is adapted, when the member is secured to the container, to circumscribe at least a portion, preferably a major portion and more preferably all, of the outer peripheral surface of the container.

The container has a length extending between a first or top end, which is often open or adapted to be opened, and a substantially opposing second or bottom end, which is often closed. The magnifying lens preferably has a lens thickness extending substantially perpendicular to the length of the container and a lens length extending between a top end and a bottom end substantially parallel to the length of the container. The lens length typically is larger than the lens thickness. The member can have a plurality of magnifying lenses. For example, two magnifying lenses at substantially right angles, that is about 90°, to each other can be provided in a single member. Such plurality of magnifiers facilitates reading information on a container regardless of the orientation of the information on the container. The magnifying lens can be located on only a portion of the member. Alternately, the magnifying lens can be substantially coextensive with, that is, cover substantially the entire outer surface of, the member. To illustrate, the length of the magnifying lens can be less than the length of the member or can be substantially equal to the length of the member.

The magnification power of the present magnifying lens preferably is relative to the magnification power, if any, of a similar member without the magnifying lens. For example, the portion of the member other than the magnifying lens may itself provide a relatively small degree of magnification. The magnification power of the magnifying lens preferably is in addition to the magnification power, if any, of the portion of the member other than the magnifying lens. One preferred feature of the present invention is that the magnifying lens has a controlled magnification power. Thus, the present members can be designed and customized to have the desired degree of magnification, for example, which may vary depending upon the application involved, the eyesight of the user and the size and/or format of the information located on the container. The controlled magnification power of the present magnifying lens preferably is in a range of about 1.2 or about 1.5 to about 2.5 or about 3. The magnifying lens may have any suitable configuration effective to provide the desired degree of magnification. In one embodiment, the magnifying lens includes at least one surface which is convex. A magnifying lens having a convex surface and a generally opposing substantially plano or flat surface provides very useful results. Of course, it is understood that the convex and substantially plano surfaces may be curved to conform to the shape of the container on which the member is placed.

In one embodiment, the magnifying lens is a Fresnel lens.

Preferably, the member is further adapted to be removed from one container and reused by being secured to a different container to facilitate identifying information located on the different container. Thus, the present member can be sold separate and apart from the container to which it is to be secured. Of course, the member can be sold or otherwise provided to the consumer along with the container on which it is to be secured.

In a very useful embodiment, the present apparatus further comprises a label portion adapted to include identification information and to be secured to the container so that the identification information is magnified by the magnifying lens when the member is secured to the container. The label portion preferably is part of the member, more preferably is unitary with the member.

In one useful embodiment, the member is further adapted to provide indication information effective to distinguish the container when the member is secured thereto, preferably relative to an identical container having a different indicating member attached thereto.

The indication information provided by the member or members in accordance with the present invention may be any one or more pieces or bits of information which is recognizable by the user of the container as distinguishing that container from one or more other containers. Among the types of indication information that may be used are visual indication information, that is information that is recognized using the sense of sight, tactile indication information, that is information that is recognized using the sense of feel or touch, audible indication information, that is information that is recognized using the sense of hearing, smell indication information, that is information that is recognized using the sense of smell, and combinations thereof. Each of these types of indication information include many, many examples, all of which are included within the scope of the present invention.

To illustrate, visual indication information can involve, among other visually recognizable factors, color, visually recognized marking or markings and shapes and the like. Tactile indication information can involve, among other tactically recognizable factors, texture, other surface features or structures, marking or markings which may not be completely or accurately visually recognizable and the like. Audible indication information can involve, among other audibly recognizable factors, mechanically created sound, electronically created sound, user activated sound, synthetically produced voice sounds and the like. Smell indication information can involve, among other smell recognizable factors, perfumed or otherwise scented members, "scratch and sniff" members and the like.

In one preferred embodiment, the indication information is recognizable by at least two, that is, two or more, senses. For example, the member used can have a specific color (visually recognizable), have a specific shape (tactically recognizable), be adapted to be rubbed against a surface to make a specific sound (audibly recognizable), and be made of a polymer including a specific fragrance (smell recognizable). Many forms of indication information are susceptible to "two sense", e.g., visual and tactile, recognition. For example, size indication information and number, e.g., the number of members secured to any specific container, indication information, surface feature or structure indication information and configuration or shape indication information, are among the forms of indication information that may be recognized by at least two senses.

Indication information recognizable by at least two senses provides substantial advantages. Such information allows the user to make two separate and independent determinations as to the identity of the container so that the comfort level of the user is increased. However, there are circumstances in which only a single sense can be used to identify the container. For example, the user may be physically impaired. The member or members secured to the container can provide two different and distinct pieces of indication information recognized by the same sense, for example, the sense of feel. Thus, the user can make two separate and independent determinations of the container identity and is given an increased degree of comfort that the correct pharmaceutical has been selected even though he or she is visually impaired or is in an unlighted environment.

Apparatus useful to distinguish containers are disclosed in commonly assigned U.S. Pat. No. 6,240,668, patented Jun. 5,2001, the disclosure of which is hereby incorporated in the entirety by reference.

Another aspect of the present invention involves additional apparatus to facilitate identifying information. Such apparatus comprise an elongated member including a Fresnel lens. Preferably, the Fresnel lens extends along at least a major portion, preferably substantially all, of the length of the elongated member. The elongated member advantageously has sufficient length and flexibility to circumscribe at least a portion, for example, at least a major portion, that is at least about 50%, and preferably all, of a curved exterior surface of a container. Thus, the elongated member preferably has sufficient flexibility and length to completely circumscribe the curved exterior surface of a container.

The elongated member preferably is adapted to adhere to the exterior surface of the container. For example, the elongated member may be provided with an adhesive effective to adhere the elongated member to the container. Alternately, the elongated member may be adapted to self-adhere, that is without an added adhesive, to the exterior surface of a container. For example, the elongated member, preferably made of elastomeric polymeric material, may have sufficient intrinsic or inherent surface stickiness so as to self-adhere to itself and/or to the surface of a container.

Such stickiness may be sufficient to effectively adhere one portion of the elongated member to another portion of the elongated member, for example, in securing the elongated member to or circumferentially around the surface of a container.

One substantial benefit of using a Fresnel lens in the present apparatus is that the Fresnel lens preferably has a magnifying power which is adjustable, for example, by controlling the distance between the lens and the object to be viewed.

Any feature or combination of features described herein is included within the scope of the present invention provided that the features of any such combination are not mutually inconsistent.

Additional aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 5 is a front plan view, partly in cross-section, showing two different pharmaceutical containers of substantially the same size, each of which includes a different alternate information identifying member in accordance with the present invention.

FIG. 6 is a plan view of an elongated member in accordance with the present invention.

FIG. 7 is a side plan view of the elongated member of FIG. 6.

FIG. 8 is a front plan view, partly in cross-section, showing a pharmaceutical container with the elongated member of FIG. 6 wrapped around and secured to the container.

FIG. 9 is a front view, partly in cross-section, of a pharmaceutical container including another information identifying member in accordance with the present invention positioned for use on the container.

FIG. 10 is a perspective illustration of a pharmaceutical container including a further information identifying member in accordance with the present invention positioned for use on the container.

FIG. 11 is a front view of a pharmaceutical container including a still further information identifying member in accordance with the present invention positioned for use on the container.

FIG. 12 is a cross-sectional view taken generally along line 12—12 of FIG. 11.

FIG. 13 is a partial cross-sectional view taken generally along line 13—13 of FIG. 12.

FIG. 14 is a perspective illustration of a drum containing a chemical composition to which is secured an information identifying member in accordance with the present invention.

DETAILED DESCRIPTION OF THE DRAWINGS

The invention is described herein primarily in the context of pharmaceutical containers. This is an important application of the present application. However, the invention is useful in other applications, particularly in applications in which a container is used for holding material and includes information, for example, on the outer peripheral surface of the container, such as on a label. Examples of containers on which members in accordance with the present invention can be used include, but are not limited to, food containers, chemical containers, personal care product containers, industrial product containers and the like.

Figure 1:
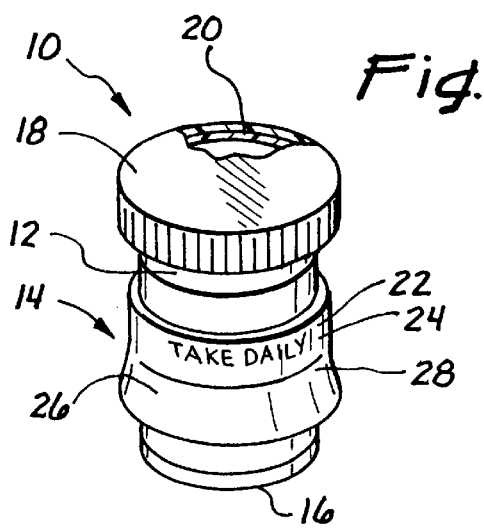
FIG. 1 is a perspective illustration, partly in cross-section, of a pharmaceutical container including an information identifying member in accordance with the present invention being prepared for use.
Figure 2:
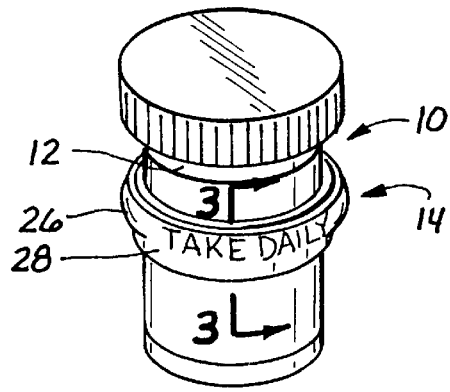
FIG. 2 is a perspective illustration showing the pharmaceutical container in FIG. 1 with the information identifying member positioned for use on the container.

Referring now to FIGS. 1 and 2, a pharmaceutical container 10 includes an outer peripheral sidewall 12 around which is removably secured an elastomeric member 14. Container 10 includes a closed bottom end 16 and a cap 18 secured to and covering an open top end 20. The pharmaceutical containers illustrated in FIG. 4 also have closed bottom ends, caps and open top ends.

The elastomeric member 14 is a single, or unitary, article, and is made of any suitable material of construction, such as an elastomeric polymeric material or composition. For example, member 14 may be made from a thermosetting rubber, including but not limited to, a suitable silicone polymeric elastomer, such as a cross-linked polysiloxane-based elastomer. Member 14 may advantageously be made of a thermoplastic polymeric material, such as thermoplastic rubbers or TPRs. Examples of useful TPRs include, but are not limited to, those sold under the trademark KRATON by Shell Oil, and TEKRON by Teknor Apex. Member 14 is made using conventional techniques, for example, molding techniques. Member 14 includes three portions.

The label portion 22 of member 14 includes an outer surface 24 which is slightly textured so that it can be written upon, for example, using a conventional pencil or pen, to provide information useful to the user of container 10.

As shown in FIG. 1, magnifying portion 26 of member 14 is positioned away from label portion 22. Magnifying portion or lens 26 is at least translucent, preferably substantially transparent and more preferably substantially optically clear for enhanced viewing. Intermediate portion 28 of member 14 is located between label portion 22 and magnifying portion 26, and together with label portion 22 is effective to elastically secure member 14 to container 10.

Figure 3:
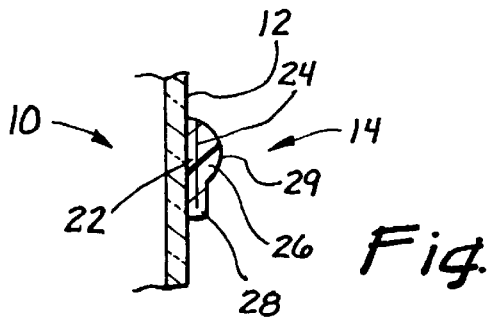
FIG. 3 is a partial cross-sectional view taken generally along line 3—3 of FIG. 2.

In the configuration shown in FIG. 1, a pencil or pen can be used to provide a written message on outer surface 24, such as the "take daily" shown in the drawings. After this information is provided on outer surface 24, magnifying portion 26 is rolled upwardly over label portion 22, as shown in FIGS. 2 and 3. In this configuration, magnifying portion 26 magnifies the information on outer surface 24, as shown in FIG. 2. Magnifying portion 26 has a controlled magnifying power of about 2.5 power. Magnifying portion 26 has a convex outer surface 29 and a length, parallel to the sidewall 12, which is larger than the thickness, perpendicular to the sidewall 12, of the magnifying portion.

This member 12 is very effective in presenting the information on outer surface 24 so that the user of container 10 can easily and effectively see this information and follow the directions.

The information on outer surface 24 can be changed simply by moving magnifying portion 26 away from label portion 22. The old information on outer surface 24 can be erased, for example, using a rubber eraser or manually rubbing the outer surface if a non-indelible marker or writing instrument was used previously. A pencil or pen is used to provide new information on outer surface 24 and the magnifying portion 26 is rolled upwardly over label portion 26.

After the contents, that is the pharmaceutical, in container 10 have been exhausted, elastomeric member 14 can be removed from container 10 and reused on another pharmaceutical container with the same or different information included on outer surface 24.

Member 14 is a unitary structure in that the label portion 22, the magnifying portion 26 and the intermediate portion 28 therebetween are all parts of a single piece. All three portions 22, 26 and 28 completely circumscribe the container 10. Member 14 can be easily removed, e.g., using manual force, from container 10. The elasticity of member 14 allows for use of the member on containers of different sizes, for example, on containers having diameters which are larger then the diameter of member 14 at rest (separated from container 10) by an amount in the range of about 20% or about 50% to about 100% or about 300% or more, for example, depending on the inherent elasticity or Shore A hardness of the material of construction of the member.

Figure 4:
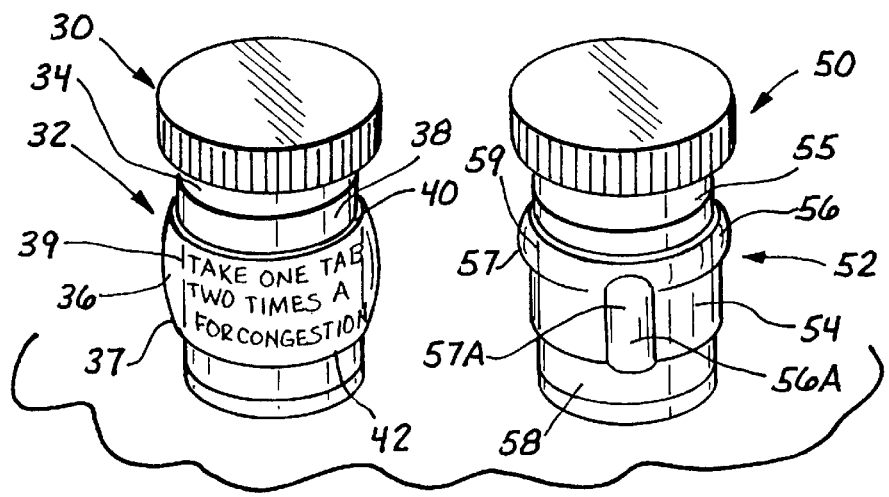
FIG. 4 is a perspective illustration of two different pharmaceutical containers of substantially the same size, each of which includes a different information identifying member in accordance with the present invention.

FIG. 4 illustrates two alternate embodiments of the present invention.

Pharmaceutical container 30 includes an elastomeric member 32 in accordance with the present invention removably secured around the outer sidewall 34 of the container. Except as expressly described herein, member 32 is constructed and can be used similarly to member 14.

Member 32 includes a magnifying portion or lens 36 which is substantially coextensive with the member 32. Magnifying portion 36 includes a convex outer peripheral surface 37 and a flat or plano inner peripheral surface 39. Throughout this document, references to convex surfaces and flat or plano surfaces of a member, magnifying portion or magnifying lens, relate to the configuration of the surfaces when viewed in profile. Since the member, magnifying portion or magnifying lens often is adapted to be placed at least partially around a container, for example, a cylindrical container, the surfaces in question often are curved, for example, cylindrical, in configuration.

Magnifying portion 36 is effective in removably securing member 32 to container 30. Container 30 includes a label 38 taped and/or glued to outer sidewall 34 of the container. The member 32 is placed over the label 38 so that the magnifying portion 36 magnifies at least a portion of the information included on the label 38. The relatively large magnifying portion 36 provides magnification for a relatively large portion of the information on label 38.

One additional advantage of member 32 is that its configuration, that is a convex surface across its entire length from top 40 to bottom 42, provides a tactile indication which distinguishes container 30 from other containers to which members similar to member 32 are not secured. That is, the configuration of the member 32 allows one to tactilely distinguish the container 30 from other containers which do not include a member configured as is member 32.

Pharmaceutical container 50 in FIG. 4 includes an elastomeric member 52 in accordance with the present invention removably secured around the outer sidewall 55 of the container. Except as expressly described herein, member 52 is constructed and can be used similarly to member 14.

Member 52 includes a securement portion 54, which includes an outer peripheral surface and an inner peripheral surface both of which are plano or flat, and a spaced apart magnifying portion or lens 56 which circumscribes the outer sidewall 55 and an additional magnifying portion 56A which is oriented at 90° relative to magnifying portion 56. Container 50 includes a label 58 taped or glued to sidewall 55. The magnifying portion 56 includes a convex outer peripheral surface 57 and a piano or flat inner peripheral surface 59. Additional magnifying portion 56A also has a convex outer peripheral surface 57A and a plano or flat inner peripheral surface 59. Together, magnifying portions 56 and 56A are positioned relative to label 58 so that important information on the label, presented horizontally and/or vertically, is magnified using the magnifying portions. Thus, the two differently oriented magnifying portions 56 and 56A advantageously provide additional flexibility in allowing differently oriented information on label 58 to be magnified and easily read.

The configuration of member 52 can be used to tactilely distinguish the container 50 from other containers which do not include a member configured as is member 52.

Considering both containers 30 and 50 of FIG. 4, one can tactilely distinguish between these two containers without seeing information through the magnifying portions 36, and 56 and 56A. This is so because the configurations of the members 32 and 52 are substantially different to the touch and can be visually distinguished one from the other.

FIG. 5 illustrates two further embodiments of the present invention.

Pharmaceutical container 60 includes an elastomeric member 62 in accordance with the present invention, removably secured around the outer sidewall 64 and base 65 of the container. Except as expressly described herein, member 62 is constructed and can be used similarly to member 14.

Member 62 includes a magnifying portion or lens 66 which surrounds or circumscribes the outer sidewall 64 of container 60. A lower portion 67 of member 62 surrounds or circumscribes the portion of the outer sidewall 64 adjacent to the base 65. Member 62 further includes a bottom portion 69 which comes in contact with the base 65 of container 60. Member 62 includes a central bottom hole 71. In effect, member 62 forms a cup into which the lower region 73 of container 60 can be placed.

Container 60 includes a label 68 taped or glued to the outer sidewall 64 of the container. The member 62 is placed over a portion of the label 68 so that the magnifying portion 66 magnifies at least a portion of the information included in the label 68. One additional advantage of member 62 is the presence of one (1) projection 75 which provides a tactile (as well as visual) indication that distinguishes container 60 from other containers to which members similar to, but not identical to, member 62 are secured.

This feature is illustrated more clearly by considering the pharmaceutical container 160 of FIG. 5. Except as expressly described herein, pharmaceutical container 160 and member 162 are substantially similar in structure and functioning to pharmaceutical container 60 and member 62, respectively. Components of container 160 and member 162 which correspond to components of container 60 and member 62, respectively, are indicated by the same reference numeral increased by 100.

The primary difference between member 162 and 62 involves the presence of two (2) projections 175 included on member 162. Thus, a tactile (as well as visual) distinction between member 162, which includes two (2) projections 175, and member 62 which includes only one (1) projection 75 is provided. The user of the containers 60 and 160 is able, by touching or feeling the respective members to determine whether he or she is touching container 60 or container 160. Thus, the members 60 and 160 provide useful information even without using the magnifying lenses 66 and 166.

FIGS. 6 and 7 illustrate an additional embodiment of the present invention.

An elongated strip 80 includes a central portion 82 which includes a Fresnel lens 84 on one surface. Two spaced apart portions 86 and 88 are located on either side of the central portion 82. Elongated strip 80 is a unitary structure made of elastomeric polymeric material, such as described elsewhere herein. In addition, the surfaces 90 and 92 of portions 86 and 88, respectively, directly adjacent Fresnel lens 84 have sufficient stickiness to adhere to a container, as is described hereinafter. This surface stickiness can be provided by an added adhesive or can be an inherent property of the material from which elongated strip 80 is made. Elongated strip 80 can be produced using conventional techniques, for example, conventional molding techniques.

FIG. 8 shows elongated strip 80 placed or wrapped around label 108 and the outer sidewall surface 104 of container 100. Elongated member 80 has sufficient flexibility to be wrapped around the curved surface 104 of container 100. Elongated strip 80 is adhered to or self-adhered to the outer surface 104. Alternately, elongated strip 80 can be sized to be overwrapped around the outer surface 104, that is elongated strip 80 can be sized to more than circumscribe the outer surface 104. The elongated strip 80 is adapted to be adhered or self-adhered to itself when the strip is overwrapped around the container 100 to facilitate securing the strip to the container. The label 108 is taped or glued on the outer surface 104 of container 100 and includes information useful to the consumer of the pharmaceutical in the container. The Fresnel lens 84 located on the inner surface of the central portion 82 is useful to magnify at least a portion of this information, thereby making it easier to read and providing benefits to the consumer.

One additional advantage of elongated strip 80 is that the magnifying power of the Fresnel lens 84 can be adjusted somewhat by varying the distance between the portions 86 and 88. For example, if it is desired to have increased magnifying power, the elongated strip 80 can be placed around the outer surface 104 of container 100 so that the portions 86 and 88 are relatively close together. This will increase the distance between the Fresnel lens and label 88, thereby increasing the magnifying power of the lens.

Referring now to FIG. 9, a pharmaceutical container 110 includes an elastomeric member 114 in accordance with the present invention removably secured around the outer peripheral sidewall 112 of the container. Except as expressly described herein, member 114 is constructed and can be used similarly to member 14. Components of member 114 which correspond to components of member 14 are identified by the same reference number increased by 100.

The primary differences between member 114 and member 14 relate to additional features included in member 114. Specifically, member 114 includes an upwardly extending securement portion 93 and a plurality of spaced apart reinforcing ribs 95. These two features are effective in maintaining the position of the member 114 on the container 110 so that the information on label portion 124 can be clearly viewed by the user of the container. Thus, the added contact surface provided by securement portion 93, reinforced or strengthened by ribs 94, secures the member 114 to the container 110 with increased force, for example, relative to an identical member without the securement portion 93 and the ribs 94.

Referring now to FIG. 10, a pharmaceutical container 310 includes an outer peripheral sidewall 312 partially around which is removably secured a substantially rigid member 314. Container 310 includes a closed bottom 316 and a cap 318 secured to and covering an open top end.

The substantially rigid member 314 is a single, or unitary, article, and is made of any suitable material of construction, such as a substantially rigid polymeric material or composition which is substantially transparent, preferably substantially optically clear. For example, member 314 may be made from a suitable substantially rigid acrylic polymeric material, such as polymethyl methacrylate, polycarbonate, and the like. Member 314 is made using conventional techniques, for example, molding techniques.

Member 314 is in the form of a C-clamp. That is, member 314 only partially circumscribes the outer peripheral sidewall 312 of container 310. Member 314 includes a magnifying portion or lens 320 which is substantially co-extensive with the member 314. Magnifying portion 320 includes a convex outer peripheral surface 322 and a flat or plano inner peripheral surface 324. The relative rigidity of the member 314 is effective in removably securing the member to container 310, for example, by friction fitting. Although member 314 is adapted to be secured onto containers of slightly varying diameters or sizes, such variation in size or diameter is substantially less than with the elastomeric members described elsewhere herein. Thus, it is preferred that the member 314 selected for use with container 310 have only a slightly smaller inner diameter, at rest, relative to the diameter of the sidewall 312.

The member 314 is placed over the taped or glued on label 328 located on sidewall 312 so that the magnifying portion 320 magnifies at least a portion of the information included on the label. The relatively large magnifying portion 320 provides magnification for a relatively large portion of the information on label 328.

The member 314 can be easily removed from the container 310 by manually pulling apart the opposing ends 330 and 332 of the member. Similarly, the member 314 can be replaced on the container 310 by manually holding the two ends 330 and 332 apart while placing the member on the sidewall 312. The two ends 330 and 332 are then released causing the member 314 to contract, thereby frictionally securing the member to the sidewall 312.

Referring now to FIGS. 11, 12 and 13, pharmaceutical container 410 includes an outer peripheral sidewall 412 around which is removably secured a substantially rigid member 414. Container 410 includes a closed bottom end 416 and a cap 418 secured to and covering an open top end.

The substantially rigid member 414 is a single, or unitary article, and is made of any suitable material of construction, such as the materials of construction set forth with regard to member 314.

Member 414 includes a magnifying portion or lens 420 which surrounds or circumscribes the outer sidewall 412 of container 410. An upper portion 422 of member 414 surrounds or circumscribes a portion of the outer sidewall 412.

With particular reference to FIGS. 12 and 13, member 414 includes an inner sidewall surface 430 and a plurality of, for example, three as shown, nibs or projections 432 which extend inwardly from inner surface 430. Each of these nibs 432 extend substantially the entire length of the member 414, that is extend substantially from the top 434 to the bottom 436 of the member 414. Each of these nibs 432 is in indirect contact (through label 444) with the outer peripheral surface 412 of the container 410. The contact between the nibs 432 and the outer peripheral sidewall 412 of container 410 acts to frictionally secure the member 414 to the container 410. The top 440 and bottom 442 of each of the nibs 432 are rounded inwardly to facilitate placing the member 414 on the container 410.

As with member 314, member 414 is substantially rigid and is adapted to be placed on and removably secured to containers that have relatively little variability in size. The nibs 432 provide some degree of flexibility in allowing the member 414 to be fit to containers of slightly varying sizes, for example, by flexing the unsupported surface 430 between nibs 432.

Magnifying portion of lens 420 includes a convex outer peripheral surface 423 and a flat or plano inner surface 430. Container 410 includes a label 444 glued to outer sidewall 412 of the container. The member 414 is placed over the label 444 so that the magnifying portion 420 magnifies at least a portion of the information included on the label 444.

FIG. 14 illustrates the use of an enlarged elastomeric member 212 in accordance with the present invention on a one (1), five (5) or ten (10) gallon chemical storage container, such as a bottle, drum, other bulk chemical storage container and the like. Of course, the container can be of any suitable size. The container, shown generally at 210, includes an outer peripheral sidewall 214 and a label 216, taped or glued onto the outer sidewall. Although not shown, the container 210 is adapted to allow chemical to pass into the container for storage and/or transportation and to be removed from the container of use. The member 212 is located over the label 216 on the peripheral sidewall 214 and includes a magnifying portion 218 which magnifies a portion of the information included on label 216. Member 212 also includes a spaced apart securement portion 220 which facilitates securing member 212 to the outer peripheral sidewall 214 of container 210. Except for its larger size, member 212 is constructed and functions similarly to member 52.

The present members very effectively provide for enhanced visualization and/or recognition of information included on containers. This allows the users of such containers to more easily and effectively access the information located on the containers and, ultimately, to use the contents of the containers properly and with increased confidence and safety.

While this invention has been described with respect to various specific examples and embodiments, it is to be understood that the invention is not limited thereto and that it can be variously practiced within the scope of the following claims.

What is claimed is:

1. An apparatus to facilitate identifying information on a container having an outer surface on which the information is provided, the apparatus comprising:

a single piece, unitary, elastomeric member including an elastomeric, deformable magnifying lens portion, the member sized and structured such that an inner surface of the magnifying lens portion of the member overlays and directly contacts the outer surface of the container when the member is secured to the container, and the member further including a label portion adjacent the magnifying lens portion.

2. The apparatus of claim 1 wherein the member is adapted to frictionally engage the outer surface of the container.

3. The apparatus of claim 1 wherein the magnifying lens portion has a lens thickness and a lens length larger than the lens thickness.

4. The apparatus of claim 1 wherein the magnifying lens portion is substantially optically clear and includes a single convex surface.

5. The apparatus of claim 1 wherein the magnifying lens portion has a magnification power in a range of about 1.2 to about 3.

6. The apparatus of claim 1 wherein the member has an elasticity sufficient to allow the member to be effectively secured to containers of various diameters.

7. The apparatus of claim 1 wherein the member further includes at least one protrusion structured to provide tactile information.

8. An apparatus to facilitate identifying information located on a container, the apparatus comprising:

a unitary, single piece, elastomeric member adapted to be secured to a container and including an elastomeric, deformable magnifying lens portion, a label portion, and identification information on the label portion; the member adapted to be secured to the container so that the magnifying lens portion overlays the label portion and directly contacts the identification information when the member is secured to the container.

9. The apparatus of claim 8 wherein the member has an elasticity sufficient to allow the member to be effectively secured to containers of various diameters.

10. The apparatus of claim 8 wherein the member further includes at least one protrusion structured to provide tactile information.

11. The apparatus of claim 8 wherein the magnifying lens portion is substantially optically clear and includes a single convex surface.

12. The apparatus of claim 8 wherein the magnifying lens portion has a magnification power in a range of about 1.2 to about 3.

13. The apparatus of claim 8 wherein the member is adapted to frictionally engage the container.

14. The apparatus of claim 8 wherein the magnifying lens portion has a lens thickness and a lens length larger than the lens thickness.

* * * * *